Patented Sept. 15, 1953

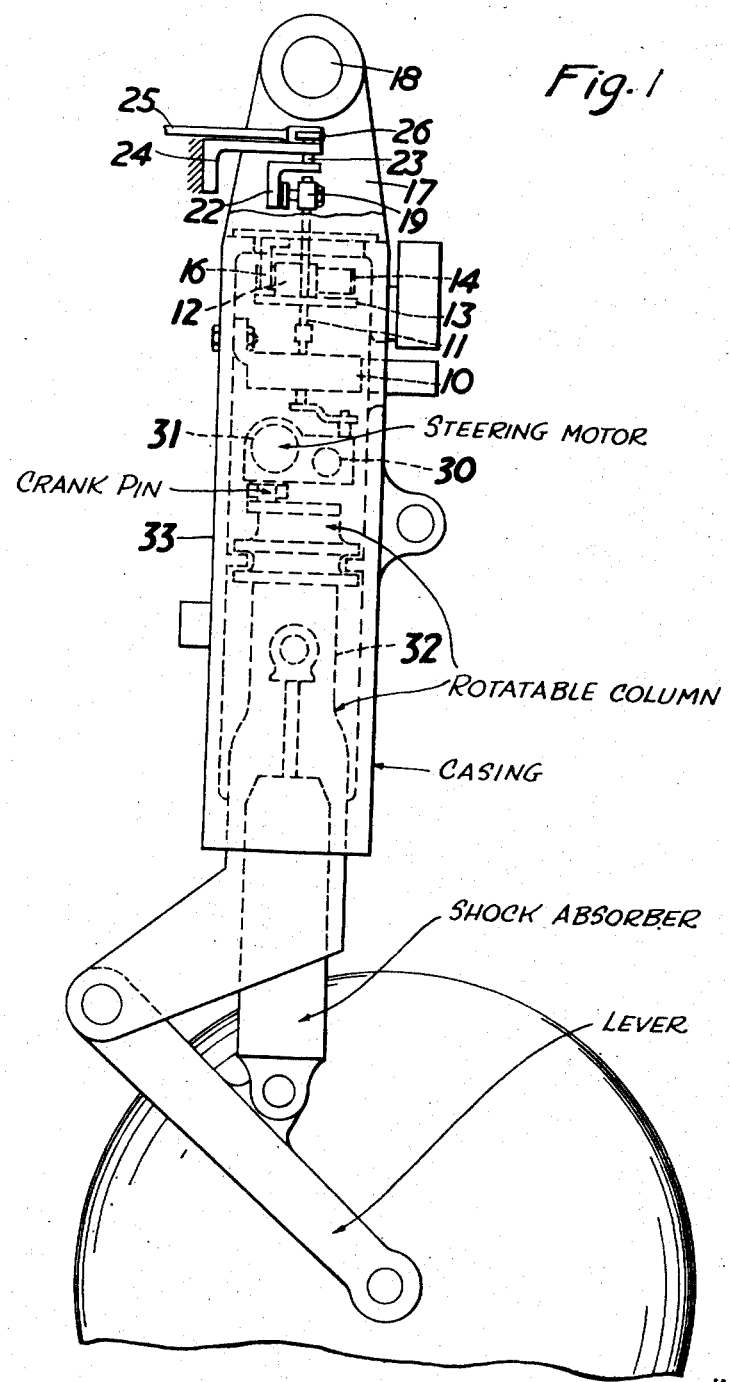

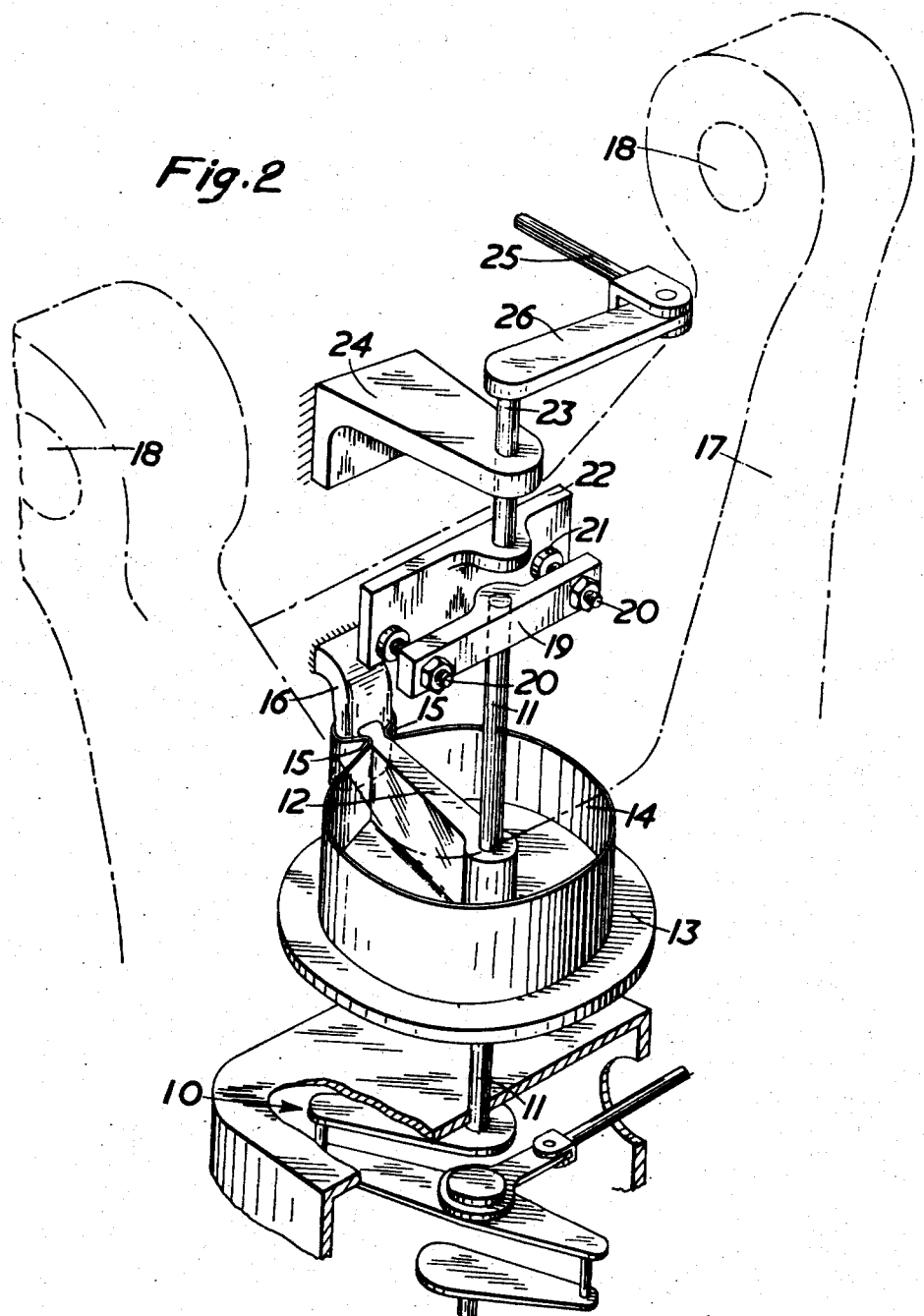

2,652,214

UNITED STATES PATENT OFFICE 2,652,214

AIRCRAFT RETRACTABLE AND STEERABLE NOSE-WHEEL AND TAIL-WHEEL MOUNTING

Richard C. Cussons, Cheltenham, England, assignor to Dowty Equipment Limited, Cheltenham, England Application June 15, 1951, Serial No. 231,847
In Great Britain May 11, 1950

1 Claim. (Cl. 244—50)

This invention relates to aircraft nose-wheel or tail-wheel mountings which are retractable and steerable, and more particularly to means whereby the landing wheel is brought into a predetermined alignment prior to its being fully retracted. Such means, known as self-centering means, have hitherto operated directly upon the steerable column supporting the landing wheel, and have had to be capable of exerting a substantial force in order to achieve their purpose. The present invention is distinguished from the known arrangements in that the wheel is brought into the desired alignment by operation of the steering motor in response to movement of the motor's servo control brought about by self-centering means operating upon said control.

The effort required to turn the servo control is small compared with that required to turn the steerable column, and the self-centering means may accordingly be simpler and lighter.

The self-centering means may comprise a small fluid pressure operated jack, a spring, or cam and follower mechanism.

An aircraft retractable and steerable nose-wheel or tail-wheel mounted incorporating self-centering means in accordance with the invention will now be described by way of example with reference to the accompanying somewhat diagrammatic drawings.

In the drawings, Figure 1 illustrates the complete retractable steering wheel mount, somewhat diagrammatically, and Figure 2 is a diagrammatic isometric view of the upper part thereof with which the present invention is concerned, some of the vertical dimensions being exaggerated for clearness. A typical steering motor servo control and follow-up mechanism of the sort with which this invention is concerned is fully described and illustrated in the specification of Dowty Patent No. 2,543,233 dated February 27, 1951, and is less fully illustrated in Figure 1 of this application. When the spindle 11 at the upper terminus of the servo control and follow-up mechanism designated generally by the numeral 10 is turned under the control of the pilot to effect steering of the column, a servo valve 30 of the hydraulic steering motor system is displaced to initiate operation of the steering motor 31 to turn the steerable column 32 which, in turning, reacts upon the follow-up linkage of the mechanism to return the servo valve element 30 to its neutral position, all as described more fully in the prior Dowty patent referred to. Whereas in prior known constructions, self-centering means operates directly upon the steerable column itself to tend to return the column 32 into a predetermined alignment, the self-centering means of the present invention operates upon the spindle 11 of the servo control to energize the steering motor 31 and its valve mechanism 30, so that the motor 31 will serve as power means to return parts to that predetermined alignment, and this will be true not only when the pilot's control is operatively connected to the spindle 11 but also when that operative connection has been broken, for example, during retraction of the landing wheel mounting.

In the example herein illustrated, there is rotatable as one with an upward extension of the spindle 11 a member comprising a radial arm 12 and base disc 13. A leaf spring 14 of the kind known as a C spring rests upon the base disc 13 and embraces the outer end of the arm 12 which has vertical channels for receiving folds 15 in the spring 14. The spring 14 is shaped beyond the folds 15 to embrace also an abutment 16 which is fixed to the retractable but non-rotatable casing 33 of the nose-wheel mounting, of which the fork 17, indicated in Figure 2 by dot-and-dash lines, is a part. When the arm 12 is turned with the spindle 11 in either direction it bears against the corresponding end of the spring 14 whilst the other end of the spring remains in engagement with the fixed abutment 16. The spring 14 is therefore further stressed during turning of the spindle 11 to tend to return the spindle 11 into its normal angular position at which the spring engages both sides of the fixed abutment 16, as seen in the drawing. The retractable part of the casing 33 in which the steerable column is journalled, is retractable about a pair of stub shafts received in journal bearings 18 at the upper part of the mounting. At the upper end of the spindle 11 there is provided a transverse bar 19 which is fixed to turn as one with the spindle. The bar 19 is fitted with adjustable studs 20 having heads 21 which engage a bar 22 on a spindle 23 which is disposed above and co-axially in line with the spindle 11. The spindle 23 is journalled in a bracket 24 which is secured to a fixed part of the aircraft structure. The spindle 23 can be turned under the control of the pilot through the push and pull rod 25 which is pivoted to an arm 26 fast upon the spindle 23. When the nose wheel mounting is swung into its fully lowered position after having been retracted, the heads 21 of the studs 20 both engage the bar 22 so that the pilot has direct control over the turning of the spindle 11 just as if the spindles 23 and 11 were extensions one of the other. When the mounting swings up during the process of retracting the nose-wheel, the bar 19 and the studs 20 move away from the bar 22 which latter remains with the spindle 23 in the fixed bracket 24. If, prior to retraction, the steerable column 32 of the mounting had been turned into a steering attitude out of the fore-and-aft alignment of the wheel, the bar 22 and with it the bar 19 and spindle 11 would be turned to some extent in either one direction, and the self-centering spring 14 would be opened and consequently given an extra stress. Directly the mounting 33, 17 swings in the act of retraction, the bar 19 will move out of contact with the bar 22, so that the spring 14 is able to return the spindle 11 into its angular position corresponding with fore-and-aft alignment of the landing wheel. The return of the spindle 11 will operate the steering motor through its servo control and follow-up mechanism 10, and the steering motor 31 controlled by mechanism 10 will thus supply the power necessary to return the wheel into the desired alignment.

During normal steering, the effect of the self-centering spring 14 is overcome by the pilot exercising control on the spindle 11 through the driving connection 22 and 19 between the spindle 23 and the spindle 11.

It will be understood that other forms of self-centering means may be employed instead of the C spring shown in the drawing, but whatever form is used, the fact that the self-centering means operates upon a spindle of the servo control and not upon the steerable column itself, it follows that the self-centering means can be simpler and lighter than if it were to operate directly upon the steerable column.

I claim:

An aircraft retractable and steerable wheel mounting comprising a non-rotatable casing adapted to be hingedly connected to an aircraft for movement between a retracted position and an extended position, a wheel-supporting column mounted rotatable about its axis in said casing, said servomotor means mounted on said casing, said servomotor means including a rotatable servo-control spindle and an associated steering motor operatively connected to said wheel-supporting column to maintain positional correspondence of said column with said servo-control spindle, centralizing spring means acting between the casing and the servo-control spindle to restore it to a rest position corresponding to the central position of the wheel-supporting column, a steering spindle mounted on the aircraft so as to lie co-axial with the servo-control spindle in the extended position of the wheel mounting, and a separable transmission coupling consisting of complementary parts fixed respectively to the servo-control spindle and to the steering spindle, said complementary parts being adapted to co-act when the wheel mounting is extended for transmitting steering control to the servomotor means in opposition to the loading of said centralizing spring means, and to separate when the wheel mounting is retracted for subjecting the servomotor means solely to the influence of the centralizing spring means.

RICHARD C. CUSSONS.

References Cited in the file of this patent

UNITED STATES PATENTS

| Number | Name | Date |
| --- | --- | --- |
| 1,030,229 | Cheney | June 18, 1912 |
| 1,084,796 | Doutre | Jan. 20, 1914 |
| 1,708,373 | Weymouth | Apr. 9, 1929 |
| 2,140,037 | Swisher | Dec. 13, 1938 |
| 2,550,137 | Corns | Apr. 24, 1951 |